Patented Mar. 12, 1946

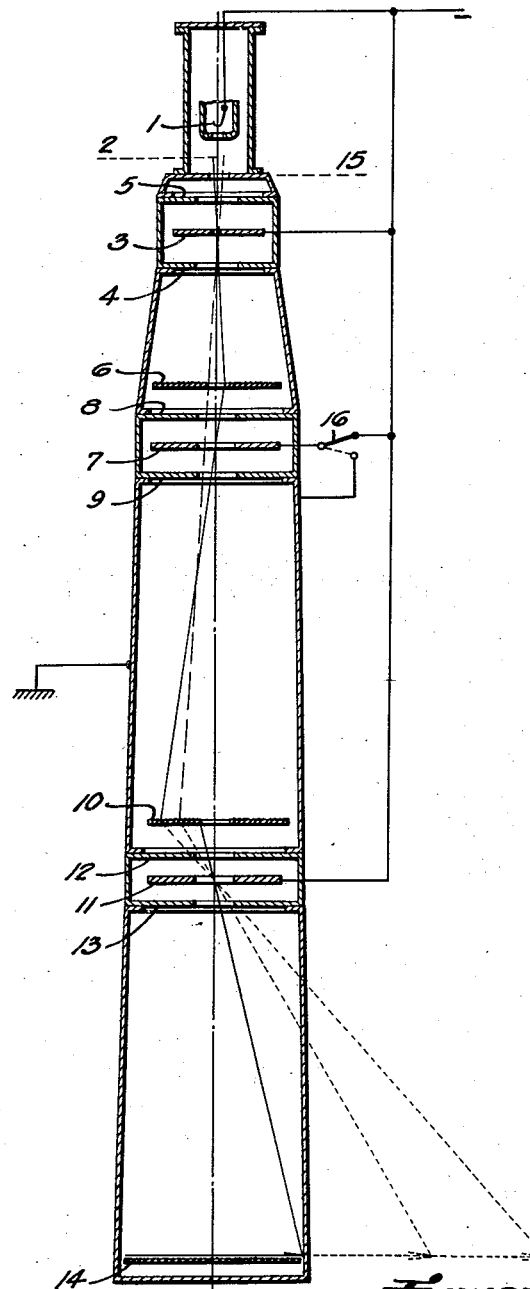

2,396,624

UNITED STATES PATENT OFFICE 2,396,624

ELECTRONIC MICROSCOPE

Bodo von Borries, Berlin-Spandau, Germany;
vested in the Alien Property Custodian Application April 19, 1941, Serial No. 389,409
In Germany March 11, 1940

2 Claims. (Cl. 250—49.5)

This invention relates to electronic microscopes provided with electrostatic lenses.

Electronic microscopes employing electrostatic lenses are well known in the art. Such electrostatic lenses have a constant magnification, since the focal length is constant. They therefore present the drawback in that a predetermined magnification depending upon the lenses employed is attained with the aid of electronic microscopes of the above-mentioned character. However, in many cases it is desirable to utilize different magnifications. This has hitherto been possible by means of electronic microscopes provided with electromagnetic lenses.

The object of the present invention is to provide an arrangement, whereby it is possible to vary the magnification with the aid of simple means also in the case of electronic microscopes employing electrostatic lenses. This may be accomplished according to the invention by the fact that at least three electrostatic lenses are provided whose dimensions and magnifications are so chosen that two- or multiple-stage magnifications may be obtained by changing over the voltage connections of the lenses without varying the vacuum. In this manner it is possible when suitably selecting the single magnifications of the lenses to construct an electronic microscope in which the magnifications may be attained in practice with the aid of simple means. The individual magnifications of the lenses are chosen according to the invention preferably in such a manner as to differ from one another. The entire optical system is so set that the maximum magnification capable of being adjusted preferably by inserting all lenses in the circuit, corresponds to the desired magnification, i. e., to the magnification in which the smallest distance between the particles of the object capable of being resolved amounts to 0.3 mm. so that it may be distinctly visible with the naked eye.

In carrying the invention into practice three electrostatic lenses are, for instance, provided which have the constant magnification $v_1$, $v_2$ and $v_3$ respectively. If in this case all three lenses are inserted in the electric circuit the total magnification $Va = v_1.v_2.v_3$ is attained. If only the first and the last lens are inserted the total magnification $Vb = (v_1+v_2).v_3$, whereas if the first and second lens are inserted the total magnification $Vc = (v_2+v_3).v_1$. Three different magnifications may therefore be attained which may be selected at will. It has been found that it is preferable to dimension the arrangement in such a manner that $Va=30,000$, $Vb=12,000$, $Vc=5,000$.

To fulfill these requirements, one of the three magnifications $v_1$, $v_2$, $v_3$ must be chosen in the neighborhood of 1,000, which has hitherto not been possible, since only focal lengths of about 4 to 8 mm. could hitherto be attained. With the focal lengths of electrostatic lenses hitherto attainable it is possible to design an arrangement which works satisfactorily by selecting $Va=30,000$, $Vb=5,000$ and $Vc=900$. The last-mentioned conditions may be substantially fulfilled, if $v_1=7$, $v_2=63$, $v_3=70$. In this case the length of the first magnification stage of the electrostatic electronic microscope is only equal to $7.f$, where $f$ is the focal length of the lens of the first stage. This first stage may be combined with the objective to form a unit.

In the accompanying single figure of the drawing is shown an embodiment of the invention in diagrammatic form. The electrons coming from the electron emitting source 1 pass through the object 2 and then enter the objective consisting of a central electrode 3 and two electrodes 4 and 5 impressed with ground potential. The first intermediate image is obtained in this arrangement on the screen 6. The electron rays then enter the first projection lens consisting of a central electrode 7 and of two electrodes 8 and 9 impressed with ground potential. The second intermediate image is produced by this lens on the screen 10. The electron rays then pass through the second projection lens 11, 12, 13 and produce the final image on the luminescent screen or on the photographic plate 14. The connection of the lenses is shown in the drawing for a three-stage magnification.

If only a two-stage magnification is employed, the projecting beam has a diameter of, for instance, 0.7 mm. at the point of the objective 3, 4, 5 in the case of an object diaphragm diameter of 0.1 mm. Since the perforation of the central electrode 7 of the second lens may easily have a diameter of 1 mm., this lens when switched out does not affect the path of rays in the case of the two-stage projection. In the case of the two-stage projection the intermediate image is produced at the point 10 which is then magnified by the projection lens 11, 12, 13 to a further extent.

In order to pass from the three-stage to the two-stage magnification and vice versa, it is only necessary to connect and disconnect the corresponding lens, for instance, the lens 7, 8, 9. A lens is inserted in the circuit by connecting the central electrode with the cathode or with a voltage source whose potential lies in the neighborhood of the cathode potential. The disconnection of a lens is effected by connecting the central electrode to ground. These changing over operations are effected by means of the switch 16. When passing from the three-stage magnification to the two-stage magnification, which is effected by disconnecting the lens 7, 8, 9, the object is displaced in the direction of the ray to the point 15. In the electronic microscope construced according to the invention it is therefore necessary that the object cartridge introduced into the vacuum chamber be so arranged as to permit the same to be displaced in the direction of the ray relatively to the electron ray, which is also necessary when focusing. The arrangement is also so designed as to enable a relative displacement perpendicularly to the direction of the ray in order that the part of the object to be magnified may be adjusted at will.

A considerable number of magnifications suitably chosen throughout the entire range may be obtained if four magnification lenses are employed. The lenses are so arranged within the microscope that they do not cause any limitation of the field of image when disconnected.

In the drawing is shown in full lines the path of ray for the three-stage magnification between the object and the last screen 10 for the intermediate image, whereas the path of ray for the two-stage magnification is shown in dotted lines. In the second magnification stage the edge ray of the final image is shown in full lines, whereas in dotted lines is shown to what extent the final image would be magnified in both cases if the intermediate image screen 10 were not employed for the limitation of the field of image.

What is claimed is:

1. An electron microscope comprising a source of electron emission, means cooperating therewith for forming emitted electrons into a beam and directing said beam through an object to be examined, an electron sensitive screen aligned with said source and beam forming means, a plurality of electrostatic lenses each of fixed magnifying power, aligned with said source and screen for projecting a portion of the beam of electrons on said screen, a source of energizing potential coupled to said lenses along with means for altering the potential of one of said lenses, to alter the total magnification on said screen, said last named means operating to change the potential at the said one lens from substantially the potential of said source of electrons to ground potential.

2. An electron microscope for examining an object comprising a source of electron emission, an electron sensitive screen, electron beam forming and directing means intermediate said emission source and screen, means including a plurality of electrostatic lenses aligned with said screen, each of fixed magnifying power, for projecting a portion of the emitted beam on said screen, each lens comprising an apertured diaphragm for limiting the image field, two annular spaced electrodes connected to a source of positive potential with respect to said source of electron emission, and an annular central electrode adapted to be normally maintained at substantially electron emission source potential, and means cooperating with one of said lenses for altering the potential thereof to render same ineffective and thereby reduce the total magnification on said screen, said last named means operating to substitute a positive potential with respect to said emission source for the potential normally maintained at the said central electrode.

BODO v. BORRIES.